US007631226B2

(12) United States Patent
Oohira

(10) Patent No.: US 7,631,226 B2
(45) Date of Patent: Dec. 8, 2009

(54) COMPUTER SYSTEM, BUS CONTROLLER, AND BUS FAULT HANDLING METHOD USED IN THE SAME COMPUTER SYSTEM AND BUS CONTROLLER

(75) Inventor: Toshio Oohira, Tokyo (JP)

(73) Assignee: NEC Corporation, Tokyo (JP)

( * ) Notice: Subject to any disclaimer, the term of this patent is extended or adjusted under 35 U.S.C. 154(b) by 340 days.

(21) Appl. No.: 11/033,901

(22) Filed: Jan. 13, 2005

(65) Prior Publication Data
US 2005/0177760 A1 Aug. 11, 2005

(30) Foreign Application Priority Data
Jan. 28, 2004 (JP) ............... 2004-019124

(51) Int. Cl.
*G06F 11/00* (2006.01)
(52) U.S. Cl. .......................................... 714/43; 714/44
(58) Field of Classification Search ............... 714/1–57; 710/1, 7, 314
See application file for complete search history.

(56) References Cited

U.S. PATENT DOCUMENTS

| 5,438,675 | A | * | 8/1995 | Fujioka ........................... 714/9 |
| 5,487,149 | A | * | 1/1996 | Sung ............................. 714/10 |
| 5,815,647 | A | * | 9/1998 | Buckland et al. ................ 714/3 |
| 6,487,623 | B1 | * | 11/2002 | Emerson et al. ............. 710/302 |
| 6,708,283 | B1 | * | 3/2004 | Nelvin et al. .................. 714/5 |
| 6,745,345 | B2 | * | 6/2004 | Cabezas et al. ............... 714/41 |
| 6,996,750 | B2 | * | 2/2006 | Tetreault ....................... 714/44 |
| 2004/0148542 | A1 | * | 7/2004 | McAfee et al. ................. 714/2 |

FOREIGN PATENT DOCUMENTS

| JP | 58-176726 | | 10/1983 |
| JP | 04-024839 | | 1/1992 |
| JP | 2001-109635 | A | 4/2001 |
| JP | 2001-273200 | | 10/2001 |
| JP | 2001-350674 | A | 12/2001 |
| JP | 2002-288049 | A | 10/2002 |
| JP | 2003-022222 | A | 1/2003 |

* cited by examiner

*Primary Examiner*—Dieu-Minh Le
(74) *Attorney, Agent, or Firm*—Foley & Lardner LLP

(57) ABSTRACT

The present invention provides a PCI bus controller to prevent system down caused by a PCI bus fault and to enable a PCI device driver to handle all PCI bus faults. A bus signal controlling portion controls a transaction with a PCI device on a PCI bus according to a PCI bus protocol, treats the PCI bus as in a degradation state by lighting up a bus fault indicator when a bus fault is detected, and accepts a request of instructing the PCI device. A configuration portion has the bus fault indicator, updates a configuration register, and sends a reply transaction to an inbound controller portion. An arbitration portion arbitrates for a PCI bus and masks a request of use a bus from PCI device when the bus is in a degradation state.

18 Claims, 12 Drawing Sheets

FIG. 4

| FUNCTION NAME | FUNCTIONALITY |
|---|---|
| pci_config_read ( ) | READING CONFIGURATION SPACE |
| pci_config_write ( ) | WRITING CONFIGURATION SPACE |
| pci_mem_read ( ) | READING PCI MAPPED MEMORY SPACE |
| pci_mem_write ( ) | WRITING PCI MAPPED MEMORY SPACE |
| pci_bus_check ( ) | CHECKING DEGRADATION STATE OF PCI BUS |
| pci_bus_recovery ( ) | REQUESTING TO RECOVER PCI BUS FROM DEGRADATION STATE |

COMPUTER SYSTEM, BUS CONTROLLER, AND BUS FAULT HANDLING METHOD USED IN THE SAME COMPUTER SYSTEM AND BUS CONTROLLER

BACKGROUND OF THE INVENTION

1. Field of the Invention

The present invention relates to a computer system, a bus controller, and a bus fault handling method used in the same computer system and bus controller, and specifically to a PCI (Peripheral Component Interconnect) bus controller controlling a PCI bus in a computer system.

2. Description of the Prior Art

Many types of computer systems have been developed and used in various fields. FIG. 11 shows an example of a minimum configuration of a computer system. This configuration has further been developed into a multiprocessor system consisting of 32 or 64 processors, with more processors or PCI devices connected to a single system, or a multiprocessor system including more than one hundred PCI bus slots.

In general, such large-scale computer systems are often used for applications that require high reliability and fault tolerance (mission critical applications). Thus, the computer systems used for those applications are required of high availability. Therefore, a technology to minimize an influence of error propagation at fault detection is needed.

FIG. 11 shows an example of a computer system configuration including a conventional PCI bus. In FIG. 11, processor (CPU: central processing unit) 61 is connected to memory controller (MMC: Main Memory Control) 62 via processor bus (FSB: Front Side Bus) 100.

Memory controller 62 is provided with I/F (interface) with main memory (DIMM: Dual In-line Memory Module) 63 and with I/O (Input/output) controller (IOC: Input/output control) 64 as well as I/F with processor 61.

Memory controller 62 is a unit consisting of one or more LSIs (large-scale integration) depending on the scale or configuration of a system and routs a transaction received from processor 61 and I/O controller 64. Main memory 63 stores an OS (Operating System) 631 including PCI device driver 632.

I/O controller 64 is provided with I/F with memory controller 62 and incorporates PCI bus controller (PBC: PCI Bus Control) 65, which controls PCI bus 200 subordinately connected to I/O controller 64. I/O controller 64 is a unit consisting of one or more LSIs depending on the scale or configuration of a system. PCI bus 200 can be connected with a plurality of PCI devices (peripheral devices) (not shown).

The above-mentioned OS 631 and PCI device driver 632 control the input/output of signals or data between application program 71 and PCI device [hardware (HW) 72] as shown in FIG. 12. OS 631 monitors a flow of signals or data between PCI device driver 632 and application program 71 to detect a fault on PCI bus 200.

In the above-mentioned computer system, a direct access from processor 61 to a PCI device or an access originating from a PCI device to main memory 63 occurs. Those accesses will be described with reference to FIG. 11.

First, a direct access from processor 61 to a PCI device will be described with the case of an I/O read [Outbound Read] from processor 61. In the case of an I/O read from processor 61, a read transaction from processor 61 to a PCI device is input into memory controller 62 then into I/O controller 64 via processor bus 100.

The read transaction arrived at I/O controller 64 is converted into a PCI bus transaction at PCI bus controller 65, sent out to PCI bus 200, and arrives at a targeted PCI device. As this transmission of a transaction over PCI bus 200 is in a common PCI cycle (memory cycle, I/O cycle, configuration cycle, etc.) and is generally known, the description of it will be omitted.

Then, a reply or read data from the PCI device returns in the opposite direction to the above route; from PCI bus 200 to PCI bus controller 65 then to memory controller 62 and to processor 61 via processor bus 100, which sent the transaction.

If a transaction fails to be sent out to PCI bus 200 by a fault or the like, the system operates as below: When an error on PCI bus 200 such as address parity error or the like occurs, the PCI device detects the error and drives system error line SERR (System Error) #, and PCI bus controller 65 that detected the error informs processor 61 of the error by means of an NMI (Non Mask Interrupt) signal line.

When an error on PCI bus 200 such as data parity error or the like is detected, PCI bus controller 65 detects the error, drives parity error line PERR (Parity Error) #, and returns an error reply instead of a read reply. Unlike a normal reply, an error reply informs processor 61 that a transaction sent from processor 61 does not complete normally.

Next, an I/O write in a direct access from processor 61 to a PCI device [Outbound Write] will be described. Two types of transactions are defined as a write from processor 61 to a PCI device: A Deferred type write (Deferred Write) where processor 61 waits for a response indicating the completion of writing into a PCI device and a Posted type write (Posted Write) where processor 61 does not wait for a response indicating the completion of writing.

A Deferred Write transaction is routed to PCI bus controller 65 along the same route as the above-mentioned route for an I/O read. The routed write transaction is converted into a PCI bus transaction at PCI bus controller 65, sent out to PCI bus 200, and arrives at a targeted PCI device. As this transmission of a transaction over PCI bus 200 is in a common PCI cycle and is generally known, the description of it will be omitted.

Then, after confirming all the data is sent (completion of a PCI cycle), PCI bus controller 65 issues a write reply. The write reply returns in the opposite direction to the above route; via memory controller 62 and processor bus 100 to processor 61, which sent the transaction.

In the case of Posted write transaction, processor 61 considers that a writing operation completed when the transaction is sent out, routs the sent out Posted Write to a targeted PCI device, and finishes an operation as the transaction when all the data is sent out to PCI bus 200.

If a transaction fails to be sent out to PCI bus 200 by a fault or the like, the system operates as below: When an error on PCI bus 200 such as address parity error or the like occurs, the PCI device detects the error and drives system error line SERR #, and PCI bus controller 65 that detected the error informs processor 61 of the error by means of an NMI signal line.

When an error on PCI bus 200 such as data parity error or the like is detected, the PCI device drives parity error line PERR (Parity Error) #, and PCI bus controller 65 detects the error and informs processor 61 of the error. For a data parity error in Deferred Write, PCI bus controller 65 sends out an error reply instead of a normal reply. For data parity error in Posted write, PCI bus controller 65 informs processor 61 of the error by means of an NMI signal line.

Now, a memory read from a PCI device subordinate to PCI bus 200 [Inbound Read] among accesses originating from a PCI device to main memory 63 will be described. A read transaction sent out to PCI bus 200 is input into PCI bus controller 65 in I/O controller 64. PCI bus controller 65 received the read transaction converts the PCI transaction into a transaction to be used in the platform, and sends the transaction out to memory controller 62. Memory controller 62 accesses main memory 63 according to the transaction received form I/O controller 64.

Reply data from main memory 63 is sent out from memory controller 62 to I/O controller 64 in the opposite direction to the above route, and sent to PCI bus controller 65 connected with the requesting PCI device. The routed reply data is converted into a PCI bus transaction at PCI bus controller 65, sent out to PCI bus 200, and sent to the PCI device, which sent the read. As this transmission of read data over PCI bus 200 is in a common PCI cycle and is generally known, the description of it will be omitted.

If a transaction fails to be sent out to PCI bus 200 by a fault or the like, the system operates as below: When an error in a PCI bus such as address parity error occurs, PCI bus controller 65 detects the error and drives system error line SERR #, while informing processor 61 of the error by means of an NMI signal line.

When a data parity error occurs while PCI bus controller 65 is sending read data to PCI bus 200, the PCI device detects the error, drives parity error line PERR#, and informs PCI bus controller 65 of the error. The PCI device that detected data parity error performs its specific error-handling.

Now, a memory write from a PCI device subordinate to PCI bus 200 [Inbound Write] among accesses originating from a PCI device to main memory 63 will be described. A write transaction from a PCI device subordinate to PCI bus 200 is input from PCI bus 200 to PCI bus controller 65 in I/O controller 64.

PCI bus controller 65 received the write transaction converts the PCI transaction into a transaction to be used in the platform and sends the transaction to memory controller 62. Memory controller 62 writes on main memory 63 according to the transaction received form I/O controller 64. As this transmission of write data over PCI bus 200 is in a common PCI cycle and is generally known, the description of it will be omitted.

If a transaction fails to be sent out to PCI bus 200 by a fault or the like, the system operates as below: When an error on a PCI bus 200 such as address parity error or the like occurs, PCI bus controller 65 detects the error and drives system error line SERR #, while informing processor 61 of the error by means of an NMI signal line.

When a data parity error occurs while a PCI device is sending write data to PCI bus 200, PCI bus controller 65 detects the error, drives parity error line PERR# and informs the PCI device of the error. The PCI device that received the information performs its specific error-handling.

[Patent Document 1] Japanese Patent Laid-Open No. 2001-273200

The above-mentioned conventional computer system activates system error signal line SERR# when it detects an error such as an address parity error or the like that cannot determine the faulty transaction on a PCI bus, during an access from a processor to a PCI device or during an access from a PCI device to main memory.

When system error signal line SERR# is asserted, usually a processor (OS) is informed of the error occurrence by means of NMI signal line. If system error signal line SERR# is synchronized with a clock, a plurality of devices is ready to be driven at the same time. In this manner, the processor can recognize the error occurrence but cannot determine the source of the error. Therefore, the processor cannot perform effective error-handling and just aborts the system (brings the system down) at the occurrence of NMI in order to prevent error propagation.

When a data parity error on a PCI bus is detected and informed a processor of the error in an error reply, special error handling with an exception handler is required. However, as specifications and controlling methods for a connected PCI device varies significantly among PCI devices, an exception handler cannot complete error handling of all the PCI devices by itself. Therefore, when an exception handler cannot perform effective error handling, it aborts the system (brings the system down) to prevent error propagation.

When a fault whose error source cannot be determined is informed by means of NMI, and when an exception handler cannot perform sufficient error handling in response to fault information in an error reply like the above example, system down is taken to prevent error propagation to the system. This is because the system lacks effective fault handling procedure at PCI bus fault.

Conventional computer systems have a problem in taking system down in order to prevent error propagation to the system, when a PCI bus fault is informed to a processor by means of an NMI signal line or an error reply and an exception handler of an OS is to handle the error as mentioned above, but the exception handler cannot provide sufficient error handling.

BRIEF SUMMARY OF THE INVENTION

The present invention intends to provide a computer system, a bus controller, and a bus fault handling method used in the same computer system and bus controller that can solve the abovementioned problem, prevent the system down caused by a PCI bus fault, and enable a PCI device driver to handle all the PCI bus faults.

A computer system according to the present invention is a computer system controlled by an OS (Operating System) and including a bus controller for controlling an input/output bus, wherein the input/output bus connects a processor, main memory, and a plurality of input/output devices; including means for preventing a fault occurred at said input/output bus from being propagated to the OS and instructing to recover from the fault.

Another computer system according to the present invention is a computer system including a bus controller for controlling an input/output bus, wherein the input/output bus connects a processor, main memory, and a plurality of input/output devices in the computer system; including:

a bridge driver for monitoring a degradation state of the input/output bus and instructing to recover the input/output bus from the degradation state;

wherein the bus controller includes means for treating a faulty input/output bus as in a degradation state and means for preventing propagation of the fault and handling a transaction performed when or after the fault occurs; and wherein the computer system causes the bridge driver and the bus controller to cooperate in causing the input/output device to perform processes from detecting of a fault on the input/output bus to recovery.

A bus controller according to the present invention is a bus controller for controlling an input/output bus in a computer system controlled by an OS (Operating System), wherein the input/output bus connects a processor, main memory, and a plurality of input/output devices; including means for preventing a fault occurred at the input/output bus from being propagated to the OS and instructing to recover from the fault.

Another bus controller according to the present invention is a bus controller for controlling an input/output bus in a system, wherein the input/output bus connects a processor, main memory, and a plurality of input/output devices in the system; including:

means for treating a faulty input/output bus as in a degradation state; and means for preventing propagation of the fault and handling a transaction performed when or after the fault occurs; and wherein said bus controller causes the input/output device to perform processes from detecting of a fault on the input/output bus to recovery in cooperation with a bridge driver, wherein the bridge driver monitors the degradation state and instructs to recover the input/output bus from the degradation state.

A bus fault handling method according to the present invention is a bus fault handling method in a computer system controlled by an OS (Operating System) and including a bus controller for controlling an input/output bus, wherein the input/output bus connects a processor, main memory, and a plurality of input/output devices; wherein the method prevents a fault occurred at the input/output bus from being informed to the OS and instructs recovery from the fault at the bus controller.

Another bus fault handling method according to the present invention is a bus fault handling method in a computer system including a bus controller for controlling an input/output bus that connects a processor, main memory, and a plurality of input/output devices; wherein a bridge driver and the bus controller cooperate in causing the input/output device to perform processes from detecting of a fault on the input/output bus to recovery; wherein a faulty input/output bus is treated as in a degradation state, propagation of said fault is prevented, and a transaction performed when or after the fault occurs is handled at the bus controller; and wherein the bridge driver monitors a degradation state of the input/output bus and instructs to recover the input/output bus from the degradation state.

That is to say, a computer system according to the present invention includes a processor, main memory, an input/output bus [PCI (Peripheral Component Interconnect)] bus and a chip set for connecting them [a memory controller and an I/O (Input/Output) controller]. The computer system is provided with a PCI bus controller and a bridge driver to cause the PCI device driver to perform processes from detecting of a fault to recovery without informing a processor and an exception handler in an OS (Operating System) of the fault on a PCI bus so that operations can be continued without taking system down.

In order to solve the above-mentioned problems, in the computer system according to the present invention, a PCI bus controller (PBC: PCI Bus Control) includes a bus fault indicator (ERI: Error Indicator) that lights up when an error on a PCI bus is detected and a PCI bus controlling portion (PXC: PCI-X Controller) that treats a PCI bus as in a degradation state when the bus fault indicator lights up and handles a transaction with a PCI bus fault detected as below.

The PCI bus controlling portion reads out ALL "1" data by (1) always returning a normal reply for an error in an Outbound Write process (a direct access of I/O Write from a processor to a PCI device) and (2) always returning a normal reply for an error in an Outbound Read process (a direct access of I/O Read from a processor to a PCI device).

The PCI bus controlling portion also (3) discards or retries a transaction when an error occurs in an Inbound Address process (an address from a PCI device subordinate to a PCI bus in an access originating from a PCI device to main memory), (4) discards a transaction when an error occurs in an Inbound Write process (a memory write from a PCI device subordinate to a PCI bus in an access originating from a PCI device to main memory), and (5) informs of data parity error (only detecting PERR#) when an error occurs in an Inbound Read process (a memory read from a PCI device subordinate to a PCI bus in an access originating from a PCI device to main memory).

The PCI bus controlling portion (1) enables an outbound transaction [though, this is not actually output to a PCI bus and returns a normal reply (reading out data is ALL "1")] and (2) does not accept an inbound transaction for following transactions sent after PCI bus comes into degradation.

The computer system according to the present invention is provided with a bridge driver for providing a monitoring process of degradation state of a PCI bus controller and a recovery process. The bridge driver has a function of detecting a fault by monitoring a degradation state of a PCI bus controller and informing a corresponding PCI device driver of the occurrence of a fault, and a function of issuing an instruction to recover the bus from the degradation state to the PCI bus controller in response to a request from a PCI device driver and informing the requesting PCI device driver of the result. In response to receiving recovery information, the PCI device driver initializes its own PCI device and reinstalls the PCI device on the system.

In the computer system according to the present invention, the above-mentioned PCI bus controller and bridge driver operate in cooperation with each other so that a PCI device driver can be informed of an occurrence of a fault. Thus, the PCI device driver can perform processes from fault detection to recovery.

Therefore, the computer system according to the present invention enables recovery from a fault and continuous operation without taking system down for an error occurrence by providing an effective fault recovery means for a PCI bus.

That is to say, in a computer system according to the present invention, a bridge driver and a PCI bus controller operate in cooperation with each other so that a faulty PCI bus can be treated as in a degradation state and a transaction performed when or after the fault occurs can be handled without propagating the fault. Thus, an occurrence of PCI bus fault can be detected without informing a CPU of the occurrence of the fault by means of an NMI signal line or an error reply, and system down as a result of executing an exception handler with insufficient function can be prevented and the computer system can operate continuously.

In a computer system according to the present invention, when a fault (any type) occurs at a PCI bus, a PCI bus controller treats the PCI bus as in a degradation state and a bridge driver can inform a PCI device driver of the faulty PCI bus of the occurrence of the fault. Thus, fault recovery can be performed by PCI device driver irrespective of the type of fault on a PCI bus.

The PCI device driver can recover a PCI bus from a fault by initializing the PCI bus with functions of a bridge driver and a PCI bus controller to recover from a degradation state and reinstalling its own PCI device.

The present invention is effective in preventing system down caused by a PCI bus fault and causing a PCI device driver to handle all the PCI bus faults with the configuration and operations described later.

BRIEF DESCRIPTION OF THE DRAWINGS

FIG. 4 is a diagram illustrating each group of functions for accessing a PCI bus that provided by a bridge driver according to an example of the present invention;

DETAILED DESCRIPTION OF THE PREFERRED EMBODIMENTS

Figure 1:
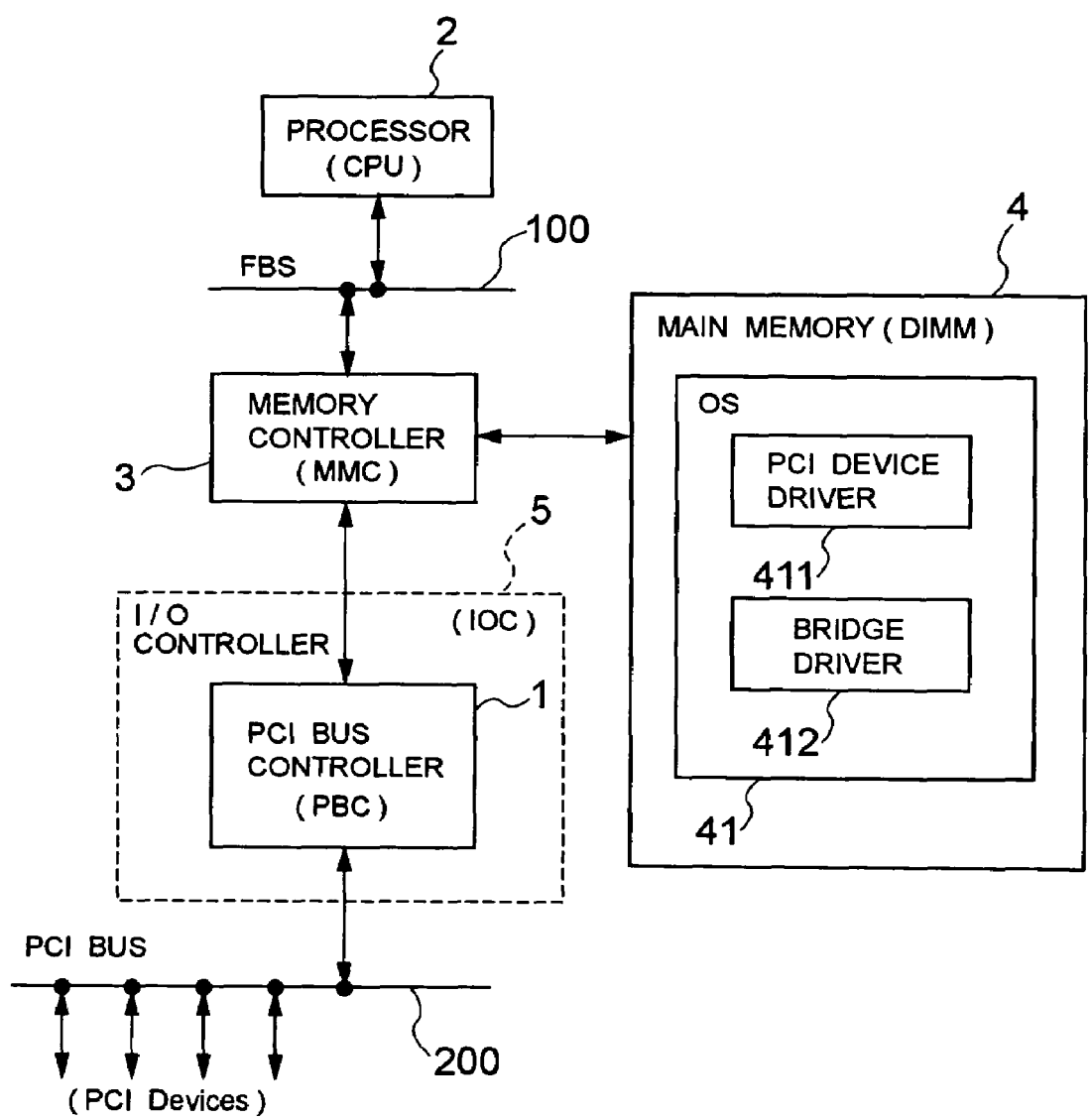
FIG. 1 is a block diagram illustrating a configuration of a computer system according to an embodiment of the present invention.

Now, an embodiment according to the present invention will be described with reference to drawings. FIG. 1 is a block diagram illustrating a configuration of a computer system according to an embodiment of the present invention. In a computer system according to an embodiment of the present invention shown in FIG. 1, processor (CPU: central processing unit) 2 is connected to memory controller (MMC: Main Memory Control) 3 via processor bus (FSB: Front Side Bus) 100 as in the abovementioned conventional computer system.

Memory controller 3 is provided with I/F (interface) with main memory (DIMM: Dual In-line Memory Module) 4 and with I/O (Input/Output) controller (IOC: Input/output control) 5 as well as I/F with processor 2. Memory controller 3 routes a transaction received from processor 2 and I/O controller 5. Memory controller 3 is a unit consisting of one or more LSIs (large-scale integration), whose number varies for the scale and configuration of the system. OS (Operating System) 41 including PCI device driver 411 and bridge driver 412 is stored in main memory 4.

I/O controller 5 is provided with I/F with memory controller 3 and incorporates PCI bus controller (PBC: PCI Bus Control) 1, which controls PCI (Peripheral Component Interconnect) bus 200 subordinately connected to I/O controller 5. I/O controller 5 is a unit consisting of one or more LSIs, whose number varies for the scale and configuration of the system. PCI bus 200 can be connected with a plurality of PCI devices (peripheral devices) (not shown).

Figure 2:
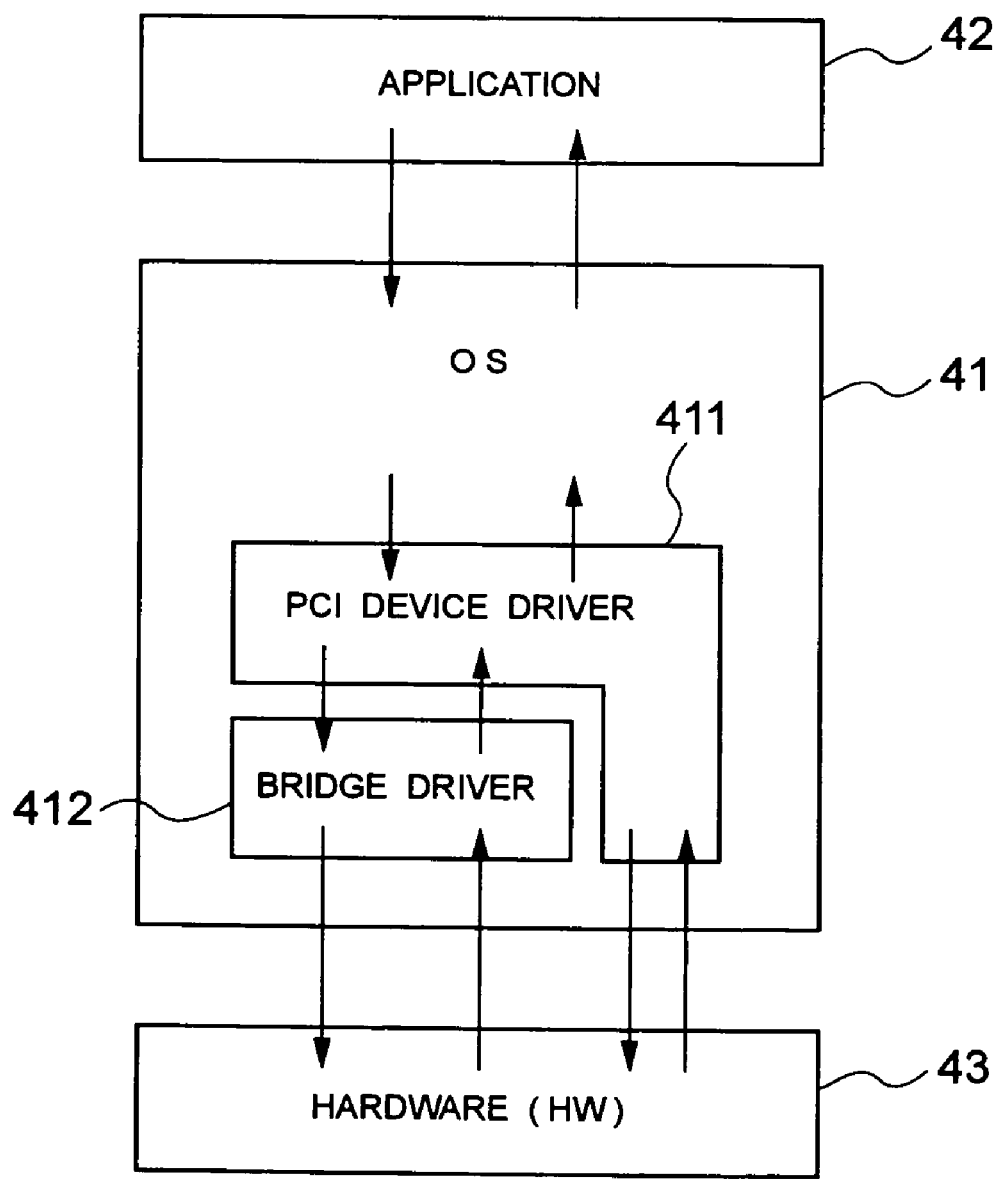
FIG. 2 is a conceptual diagram illustrating an input/output of signals to/from an OS shown in FIG. 1.

FIG. 2 is a conceptual diagram illustrating an input/output of signals to/from OS 41 in FIG. 1. In FIG. 2, OS 41 controls an input/output of signals or data between application program 42 and PCI device [hardware (HW) 43], and detects a fault on PCI bus 200 by monitoring a flow of signals and data between PCI device driver 411 and application program 42.

Bridge driver 412 relays signals or data between PCI device driver 411 and a PCI device. Bridge driver 412 operates so that OS 41 finds no contradiction in monitoring of requests and response between application program 42 and PCI device, i.e., so that OS 41 detects no fault.

Figure 3:
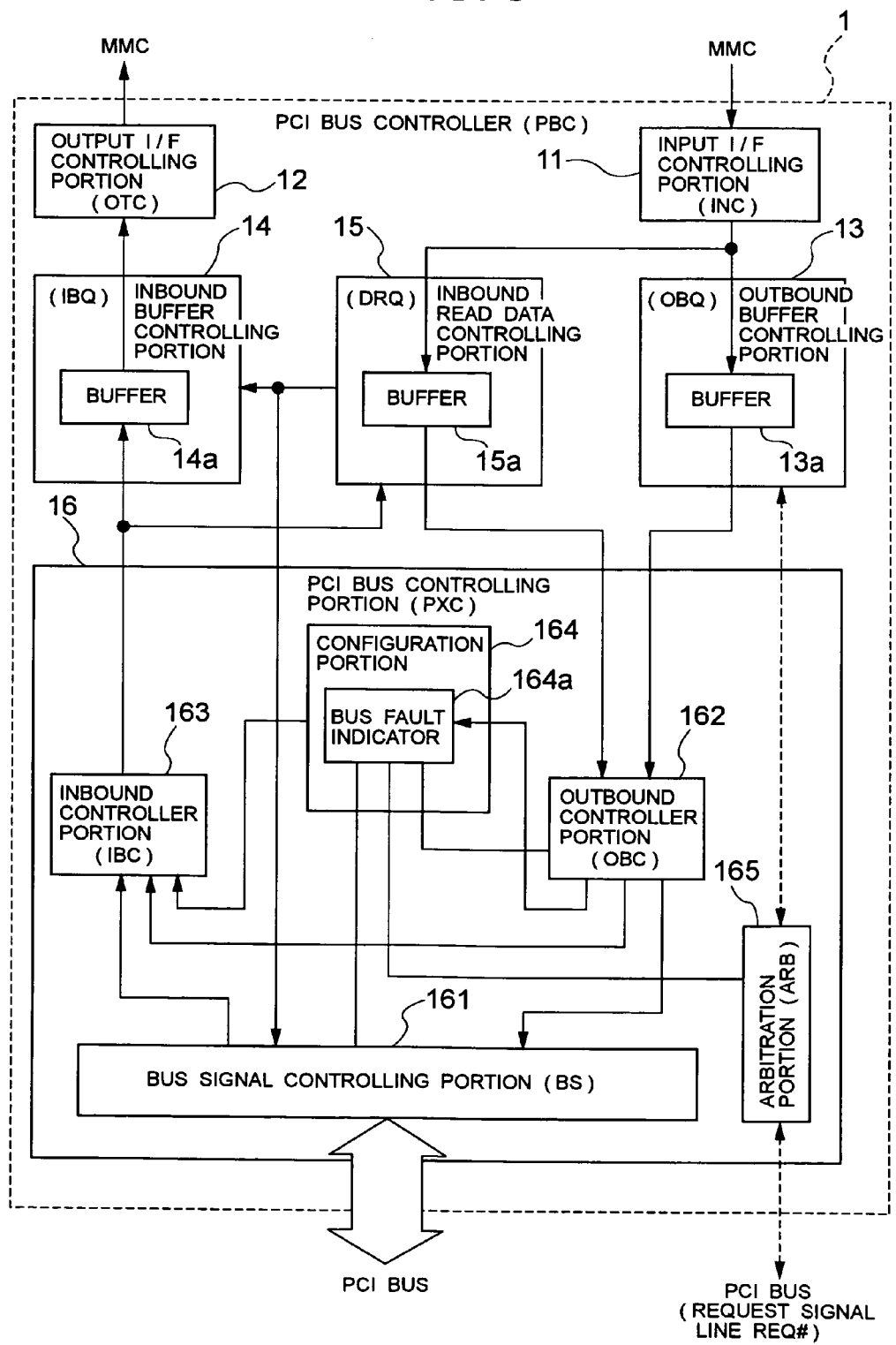
FIG. 3 is a block diagram illustrating a configuration of PCI bus controller shown in FIG. 1.

FIG. 3 is a block diagram illustrating a configuration of PCI bus controller 1 shown in FIG. 1. In FIG. 3, PCI bus controller 1 includes Input I/F controlling portion (INC: Input Controller) 11, Output I/F controlling portion (OTC: Output Controller) 12, Outbound buffer controlling portion (OBQ: Outbound Queue) 13, Inbound buffer controlling portion (IBQ: Inbound Queue) 14, Inbound read data controlling portion (DRQ: Delayed Request Queue) 15, and PCI bus controlling portion (PXC: PCI-X Controller) 16.

Input I/F controlling portion 11 receives a transaction from memory controller 3 and routes the transaction to storage location in PCI bus controller 1 based on the type of transaction.

Output I/F controlling portion 12 has I/F with Inbound buffer controlling portion 14 to send a transaction from Inbound buffer controlling portion 14 to memory controller 3.

Outbound buffer controlling portion 13 has I/F with Input I/F controlling portion 11 to receive an outbound request transaction from Input I/F controlling portion 11. Outbound buffer controlling portion 13 also has I/F with Buffer 13a to store the received transaction and with Arbitration portion (ARB: Arbitration Controller) 165 and I/F with PCI bus controlling portion 16.

When Outbound buffer controlling portion 13 stores a transaction, it issues a PCI bus use request to Arbitration portion 165. When Arbitration portion 165 admits to use the PCI bus, Outbound buffer controlling portion 13 sends its storing transaction to PCI bus controlling portion 16.

Inbound buffer controlling portion 14 has I/F with PCI bus controlling portion 16 to receive an outbound reply transaction and an inbound request transaction from PCI bus controlling portion 16.

Inbound buffer controlling portion 14 has I/F with Inbound read data controlling portion 15 to receive an inbound request transaction from Inbound read data controlling portion 15, and buffer 14a to store each of the received transactions.

Inbound buffer controlling portion 14 has I/F with Output I/F controlling portion 12 to send the received transaction to Output I/F controlling portion 12.

Inbound read data controlling portion 15 has I/F with Input I/F controlling portion 11 to receive an inbound reply write transaction from Input I/F controlling portion 11 (read data from main memory 4) and buffer 15a to store the received transaction.

Inbound read data controlling portion 15 has I/F with PCI bus controlling portion 16 to receive an inbound request transaction from PCI bus controlling portion 16.

Inbound read data controlling portion 15 checks whether data requested by the transaction is in buffer 15a. If the data is not in buffer 15a, Inbound read data controlling portion 15 sends an inbound request transaction to Inbound buffer controlling portion 14, while issuing a retry instruction to PCI bus controlling portion 16. If the data is in buffer 15a, Inbound read data controlling portion 15 reads the data out from buffer 15a and sends to PCI bus controlling portion 16.

PCI bus controlling portion 16 includes Bus signal controlling portion (BS: Bus controller) 16, Outbound controller portion (OBC: Outbound Controller) 162, Inbound controller portion (IBC: Inbound Controller) 163, Configuration portion (CFG; Configuration register) 164, Arbitration portion 165. PCI bus controlling portion 16 has a transaction controlling function between a platform and a PCI device.

Bus signal controlling portion 161 has I/F with each of Outbound controller portion 162, Inbound controller portion 163, and PCI bus 200. Bus signal controlling portion 161 has a function of controlling a transaction between itself and a PCI device connected to PCI bus 200 according to a PCI bus protocol. Bus signal controlling portion 161 lights bus fault indicator (ERI: Error Indicator) 164a when it detects a bus fault. Bus signal controlling portion 161 has I/F with Inbound read data controlling portion 15 to receive a retry instruction request to a PCI device.

Outbound controller portion 162 has I/F with each of Outbound buffer controlling portion 13, Inbound read data controlling portion 15, Bus signal controlling portion 161, Inbound controller portion 163, and Configuration portion 164 to route a transaction received from Outbound buffer controlling portion 13 or Inbound read data controlling portion 15 to Bus signal controlling portion 161, Inbound controller portion 163, and Configuration portion 164. The designation of the routing is decided according to the type of transaction and state of Bus fault indicator 164a's light.

Outbound controller portion 162 sends a configuration request transaction toward PCI bus controller 1 received from Outbound buffer controlling portion 13 to Configuration portion 164 and sends an Inbound read reply transaction received from Inbound read data controlling portion 15 to Bus signal controlling portion 161.

Outbound controller portion 162 sends an outbound request transaction received from Outbound buffer controlling portion 13 when Bus fault indicator 164a is OFF to Bus signal controlling portion 161. Outbound controller portion 162 converts an outbound read request transaction received from Outbound buffer controlling portion 13 when Bus fault indicator 164a is ON into a read reply transaction with read data of ALL "1". The data ALL "1" tells OS 41 that the bus functions normally and tells PCI device driver 411 that the bus has a fault, and has a read data error informed to application program 42. That is to say, with ALL "1" data, OS 41 operates without noticing that the bus has a fault, while application program receives read data error information from PCI device driver 411 via OS 41 and reads out desired data.

In response to an outbound Defferred write request transaction, Outbound controller portion 162 sends a write reply transaction to Inbound controller portion 163. Outbound controller portion 162 discards the outbound Posted write request transaction at Outbound controller portion 162.

Inbound controller portion 163 has I/F with each of Inbound buffer controlling portion 14, Inbound read data controlling portion 15, Bus signal controlling portion 161, Outbound controller portion OBC 162, and Configuration portion 164 to route a transaction received from Bus signal controlling portion 161, Outbound controller portion OBC 162, Configuration portion 164 to Inbound buffer controlling portion 14 or Inbound read data controlling portion 15. The designation of the routing is decided according to the type of transaction.

Inbound controller portion 163 sends a configuration reply transaction received from Configuration portion 164, an outbound reply transaction received from Bus signal controlling portion 161 and Outbound controller portion 162, and an inbound write request transaction received from Bus signal controlling portion 161 to Inbound buffer controlling portion 14. Inbound controller portion 163 sends an inbound read request transaction received from Bus signal controlling portion 161 to Inbound read data controlling portion 15.

Configuration portion 164 has a configuration register (not shown) and Bus fault indicator 164a as a portion of the register to keep information that PCI bus 200 has a fault.

Configuration portion 164 has I/F with each of Outbound controller portion 162 and Inbound controller portion 163 to update a configuration register according to an instruction of a request transaction received from Outbound controller portion 162 and send a reply transaction to Inbound controller portion 163 as needed.

Bus fault indicator 164a has I/F with each of Bus signal controlling portion 161, Outbound controller portion 162 and Arbitration portion 165. Bus fault indicator 164a lights up when Bus signal controlling portion 161 detects a fault. When Bus fault indicator 164a is reset, recovery from a fault state including a PCI bus reset is performed.

Arbitration portion 165 arbitrates between a bus use request from a PCI device connected to PCI bus 200 and a bus use request from Outbound buffer controlling portion 13 for bus usage.

Arbitration portion 165 has I/F with Bus fault indicator 164a. Arbitration portion 165 masks a bus use request from a PCI device when Bus fault indicator 164a lights up and rejects an inbound transaction.

Bridge driver 412 has various functions for accessing a PCI bus to be provided to each PCI device driver 411 and sends a transaction corresponding to an access request when a PCI bus access is requested by each PCI device driver 411 (when a provided function is called).

When Bridge driver 412 detects ALL "1" read data in processing an outbound read transaction, it checks Bus fault indicator 164a of PCI bus controller 1, checks Bus fault indicator 164a in response to a request by PCI device driver 411, and periodically checks Bus fault indicator 164a. When bridge driver 412 detects that Bus fault indicator 164a lights up, it informs each PCI device driver 411 of the error state.

Bridge driver 412 sends a transaction requesting a fault recovery operation to PCI bus controller 1 in response to a PCI bus fault recovery request by each PCI device driver 411. When the bus recovers from the fault, Bridge driver 412 informs each PCI device driver 411 of the recovery.

In order to use fault recovery means of the present invention, PCI device driver 411 is required to use a group of functions provided from Bridge driver 412 when PCI device driver 411 accesses the device and perform a right fault recovery process when Bridge driver 412 informs it of an error state.

FIG. 4 is a diagram illustrating each group of functions for accessing a PCI bus that provided by Bridge driver 412 according to an example of the present invention. In FIG. 4, a function named "pci_config_read ( )" has functionality of "reading a configuration space", a function named "pci_config_write ( )" has functionality of "writing a configuration space", a function named "pci_mem_read ( )" has functionality of "reading a PCI Mapped Memory space", a function named "pci_mem_write ( )" has functionality of "writing a PCI Mapped Memory space", and a function named "pci_bus_check ( )" has functionality of "checking a degradation state of PCI bus", and a function named "pci_bus_recovery ( )" has functionality of "requesting to recover a PCI bus from a degradation state".

Figure 5:
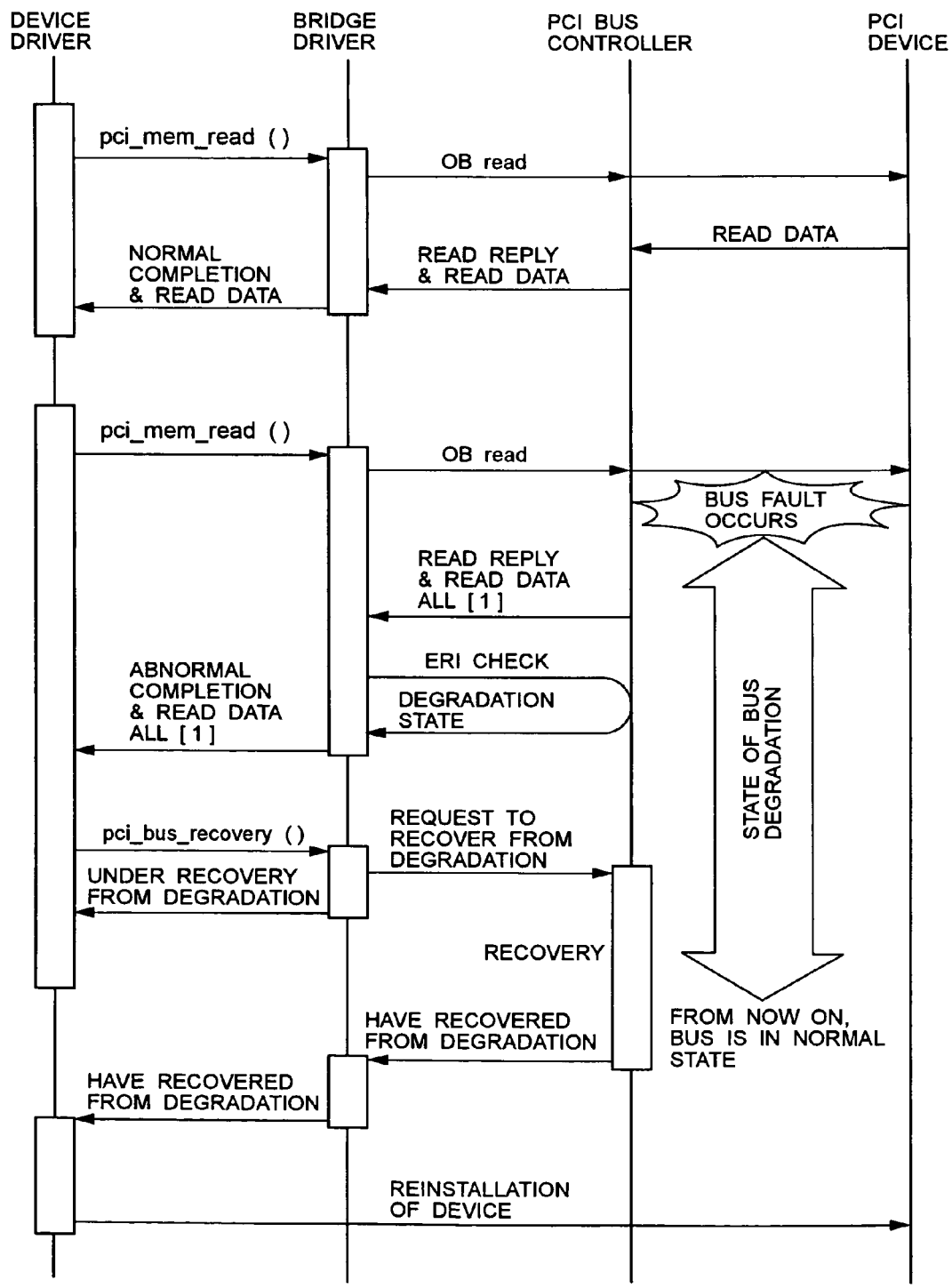
FIG. 5 is a sequence chart showing an operation of an I/O read by a processor according to an embodiment of the present invention.
Figure 6:
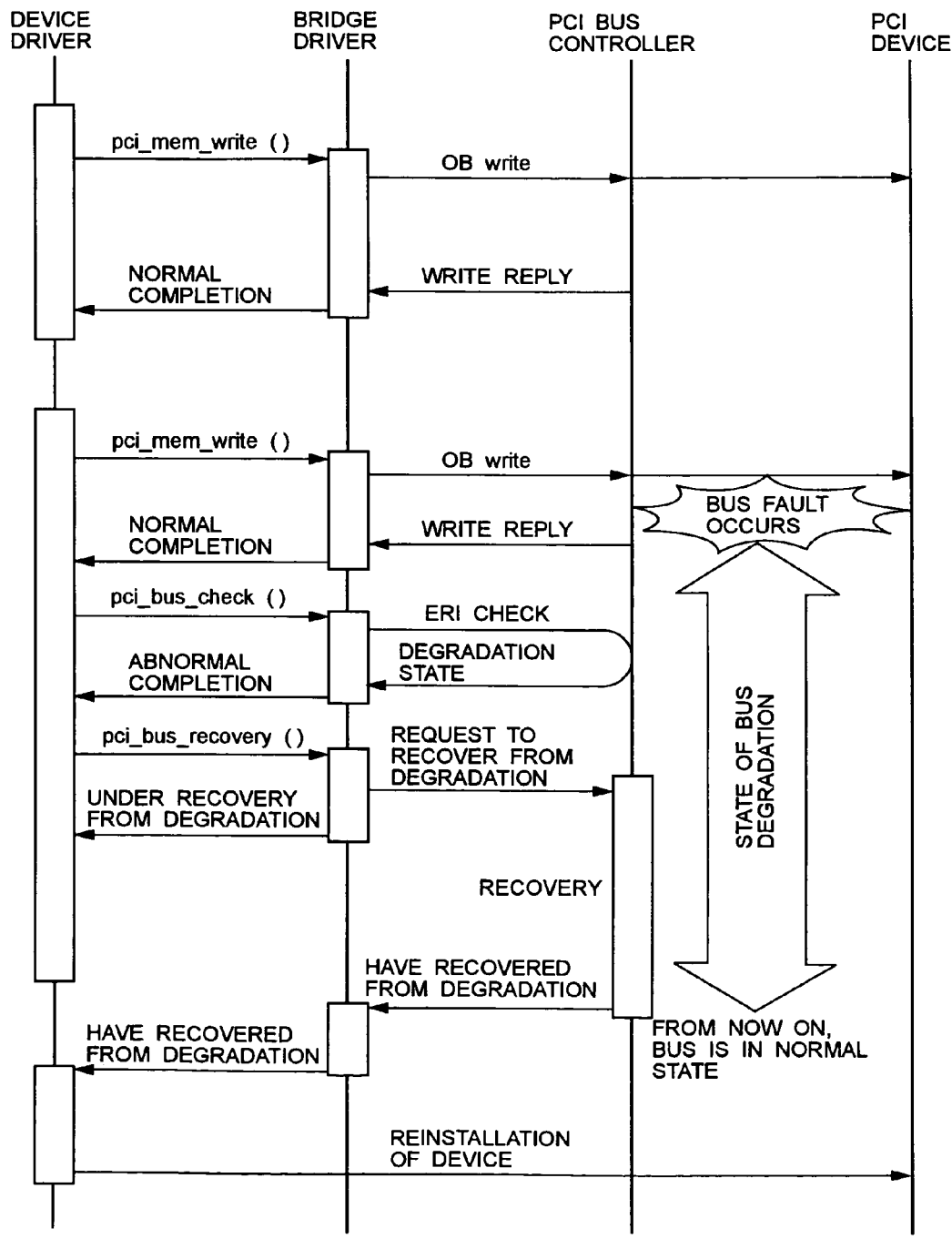
FIG. 6 is a sequence chart showing an operation of an I/O write by a processor according an embodiment of the present invention.
Figure 7:
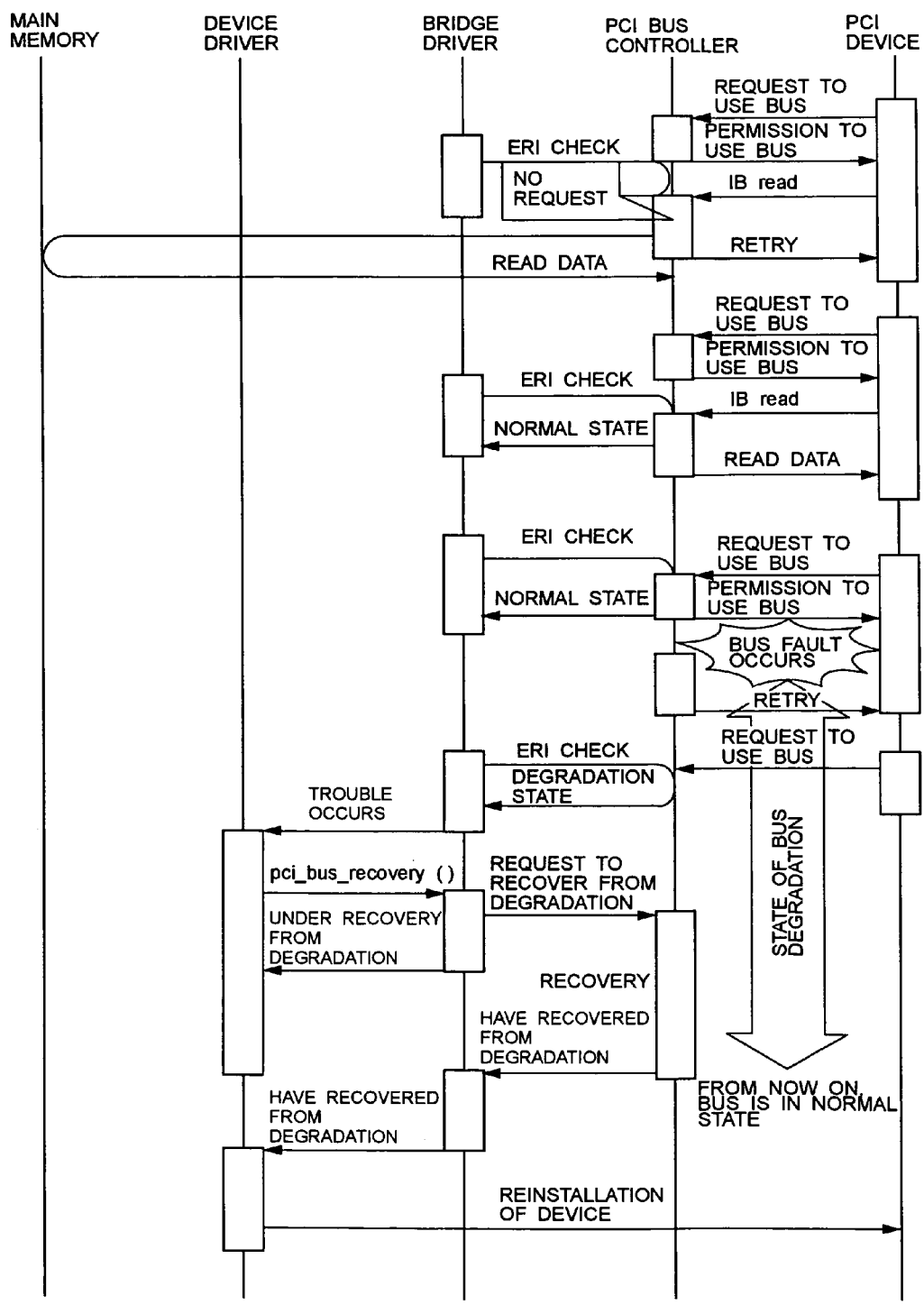
FIG. 7 is a sequence chart showing an operation of a memory read by a PCI device according to an embodiment of the present invention.
Figure 8:
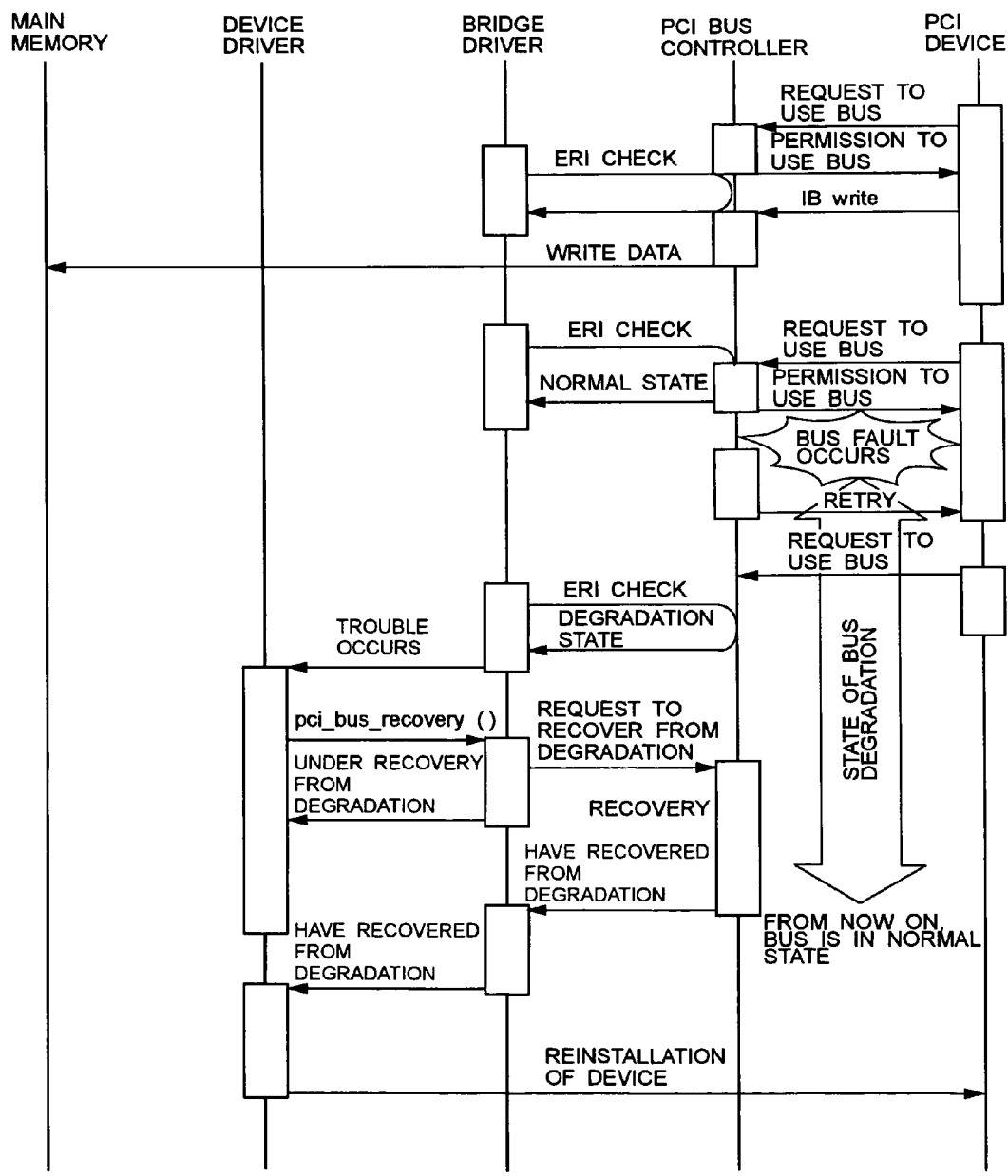
FIG. 8 is a sequence chart showing an operation of a memory write by a PCI device according to an embodiment of the present invention.

FIG. 5 is a sequence chart showing an operation of an I/O read by processor 2 according to an embodiment of the present invention. FIG. 6 is a sequence chart showing an operation of an I/O write by processor 2 according an embodiment of the present invention. FIG. 7 is a sequence chart showing an operation of a memory read by a PCI device according to an embodiment of the present invention. FIG. 8 is a sequence chart showing an operation of a memory write by a PCI device according to an embodiment of the present invention. Operations according to an embodiment of the present invention will be described with reference to FIGS. 1-8.

In a computer system according to an embodiment of the present invention, processes of (1) an I/O read by processor 2 (outbound read) (an I/O read in a direct access operation by processor 2 to a PCI device), (2) an I/O write by processor 2 (outbound write) (an I/O write in a direct access operation by processor 2 to a PCI device), (3) a memory read by a PCI device (inbound read) (a memory read in an access operation originating from a PCI device to main memory 4 by a PCI device subordinate to a PCI bus), (4) a memory write by a PCI device (inbound write) (a memory write in an access operation originating from a PCI device to main memory 4 by a PCI device subordinate to a PCI bus), (5) processing of a transaction in a degradation state, and (6) a fault detecting by Bridge driver 412 are performed respectively.

First, (1) an I/O read by processor 2 (outbound read) will be described. When PCI device driver 411 reads data out from a PCI device, it calls a read function [pci_mem_read ( )] provided by Bridge driver 412. Then, Bridge driver 412 sends an outbound read request transaction to a targeted PCI device.

The outbound read request transaction is sent out from memory controller 3 to I/O controller 5 across processor bus 100. The outbound read request transaction sent to I/O controller 5 is received at Input I/F controlling portion 11 in PCI bus controller 1.

Input I/F controlling portion 11 received the transaction determines a store location for the transaction based on the type of transaction. As the transaction is an outbound transaction here, it is stored in Buffer 13*a* of Outbound buffer controlling portion 13.

Outbound buffer controlling portion 13 storing the transaction requests a right of use PCI bus 200 from Arbitration portion 165. Arbitration portion 165 received the request arbitrates for PCI bus 200 and informs Outbound buffer controlling portion 13 of a permission to use PCI bus 200.

Outbound buffer controlling portion 13 received the information sends the transaction stored in Buffer 13*a* to Outbound controller portion 162. As Outbound controller portion 162 received an outbound read request transaction, it sends the received transaction to Bus signal controlling portion 161. Bus signal controlling portion 161 converts the received transaction into a PCI bus transaction, sends it out to PCI bus 200, and delivers it to the targeted PCI device.

The PCI device received the read request transaction (in this case is an address) sends corresponding read data onto PCI bus 200. The read data is received at Bus signal controlling portion 161. The transmission of data over PCI bus 200 is in a common PCI cycle (a memory cycle, an I/O cycle, a configuration cycle, etc.) and is generally known, the description of it will be omitted.

Bus signal controlling portion 161 received the read data sends the read data to Inbound controller portion 163. Inbound controller portion 163 stores the received read data in Buffer 14*a* of Inbound buffer controlling portion 14. When Bus signal controlling portion 161 confirmed that requested data has been received from the PCI device, it sends a normal reply to Inbound buffer controlling portion 14 through Inbound controller portion 163.

Inbound buffer controlling portion 14 received the reply sends read data stored in Buffer 14*a* and the reply out to Output I/F controlling portion 12 as a read reply transaction. Output I/F controlling portion 12 sends the received read reply transaction out to memory controller 3. The read reply transaction returns in the opposite direction to the above route; through memory controller 3 and processor bus 100 to processor 2, which sent the transaction, and to Bridge driver 412, then returns read data to PCI device driver 411 that called a function.

If a PCI bus error (an address parity error, a data parity error, SERR# detection) occurs when an outbound read transaction is performed on PCI bus 200, Bus signal controlling portion 161 in PCI bus controlling portion 16 detects the error and lights up Bus fault indicator 164*a*. At the same time, Bus signal controlling portion 161 sends a normal read reply transaction with a read data of ALL "1" to Inbound controller portion 163 in response to the read request transaction received from Outbound controller portion 162.

Inbound controller portion 163 stores the received read reply transaction in Buffer 14*a* of Inbound buffer controlling portion 14. Inbound buffer controlling portion 14 sends the read reply transaction stored in Buffer 14*a* out to Output I/F controlling portion 12. Output I/F controlling portion 12 sends the received read reply transaction to memory controller 3.

The read reply transaction returns in the opposite direction to the above route; through memory controller 3 and processor bus 100 to processor 2, which sent the transaction, and to Bridge driver 412, which issued the read transaction. After Bus fault indicator 164*a* lights up, PCI bus 200 is treated as in a degradation state.

Next, (2) an I/O write by processor 2 (outbound write) will be described. When PCI device driver 411 transfers data to a PCI device, write function [pci_mem_write ( )] provided by Bridge driver 412 is called. Then, Bridge driver 412 sends an outbound write request transaction to a targeted PCI device.

The case of Posted write transaction will be described. Posted outbound write request transaction is sent across processor bus 100 and from memory controller 3 to I/O controller 5. The outbound write request transaction sent to I/O controller 5 is received at Input I/F controlling portion 11 in PCI bus controller 1.

Input I/F controlling portion 11 received the transaction determines a store location for the transaction based on the type of transaction. As the transaction is an outbound transaction here, it is stored in Buffer 13*a* of Outbound buffer controlling portion 13.

Outbound buffer controlling portion 13 storing the transaction requests a right of use PCI bus 200 from Arbitration portion 165. Arbitration portion 165 received the request arbitrates for PCI bus 200 and informs Outbound buffer controlling portion 13 of a permission to use PCI bus 200.

Outbound buffer controlling portion 13 received the information sends the transaction stored in Buffer 13*a* to Outbound controller portion 162. As Outbound controller portion 162 received an outbound read request transaction, it sends the received transaction out to Bus signal controlling portion 161.

Bus signal controlling portion 161 converts the received transaction into a PCI bus transaction, sends it out to PCI bus 200, and delivers it to the targeted PCI device. As this transmission of a transaction over PCI bus 200 is in a common PCI cycle and is generally known, the description of it will be omitted.

Next, the case of Deferred write transaction will be described. Deferred outbound write request transaction is communicated to a PCI device in the same manner as the abovementioned one for a Posted write transaction.

As a reply is required for a Deferred write transaction, Bus signal controlling portion 161 confirms that all the data has been sent out to the targeted PCI device, then issues a normal write reply transaction to Inbound controller portion 163. Inbound controller portion 163 sends the write reply transaction to Inbound buffer controlling portion 14.

Inbound buffer controlling portion 14 sends write reply transaction out to Output I/F controlling portion 12. Output I/F controlling portion 12 sends the received write reply transaction out to memory controller 3. The write reply transaction returns in the opposite direction to the above route; through memory controller 3 and processor bus 100 to processor 2, which sent the transaction.

When a PCI bus error (an address parity error, a data parity error, SERR# detection) occurs when an outbound write transaction is performed on PCI bus 200, Bus signal controlling portion 161 in PCI bus controlling portion 16 detects the error and lights up Bus fault indicator 164a. At the same time, Bus signal controlling portion 161 discards the Posted write request transaction received from Outbound controller portion 162.

Bus signal controlling portion 161 discards the Deferred write request transaction received from Outbound controller portion 162 and sends a normal write reply transaction out to Inbound controller portion 163. Inbound controller portion 163 stores the received write reply transaction in Buffer 14a of Inbound buffer controlling portion 14.

Inbound buffer controlling portion 14 sends the write reply transaction stored in Buffer 14a out to Output I/F controlling portion 12. Output I/F controlling portion 12 sends the received write reply transaction out to memory controller 3. The write reply transaction returns in the opposite direction to the above route; through memory controller 3 and processor bus 100 to processor 2, which sent the transaction. After Bus fault indicator 164a lights up, PCI bus 200 is treated as in a degradation state.

Next, (3) a memory read by a PCI device (inbound read) will be described. A PCI device subordinate to PCI bus 200 performing a memory read drives request signal line REQ# and requests a right of use PCI bus 200 from Arbitration portion 165. In response, Arbitration portion 165 performs arbitration and gives permission of using PCI bus 200 to the requesting PCI device.

The PCI device acquired the right of using PCI bus 200 sends an inbound read request transaction to PCI bus controller 1 in I/O controller 5. Bus signal controlling portion 161 received the read request transaction converts the received PCI transaction into a transaction to be used in the platform and sends the transaction to Inbound controller portion 163.

As the received transaction is an inbound read request transaction, Inbound controller portion 163 sends the transaction to Inbound read data controlling portion 15.

Inbound read data controlling portion 15 received the read request transaction checks whether read data corresponding to the read request transaction is in Buffer 15a or not. As the read request transaction is the first one, no corresponding read data is in Buffer 15a.

Accordingly, Inbound read data controlling portion 15 sends a read request transaction to Inbound buffer controlling portion 14 to read data corresponding to the read request transaction out from main memory 4. In parallel, Inbound read data controlling portion 15 informs Bus signal controlling portion 161 that no corresponding data exists.

Bus signal controlling portion 161 received the information issues an instruction to retry to the requesting PCI device. Inbound buffer controlling portion 14 receives the read request transaction and sends the transaction to Output I/F controlling portion 12. Output I/F controlling portion 12 sends the read request transaction to memory controller 3.

Memory controller 3 accesses main memory 4 according to the transaction received from I/O controller 5. Reply data from main memory 4 is sent out from memory controller 3 to I/O controller 5 in the opposite direction to the above route and received at Input I/F controlling portion 11 in PCI bus controller 1 as an inbound reply transaction.

Input I/F controlling portion 11 receives the inbound read reply transaction and routes the transaction to Inbound read data controlling portion 15 as the transaction is the inbound transaction. Inbound read data controlling portion 15 stores the inbound read reply transaction in Buffer 15a.

When Bus signal controlling portion 161 receives the same read request transaction as the previous one from the PCI device, it sends a read request transaction to Inbound read data controlling portion 15 in the same operations as the above described one. Inbound read data controlling portion 15 receives the transaction and checks whether corresponding read data is in Buffer 15a.

As the data is in Buffer 15a here, Inbound read data controlling portion 15 sends read data corresponding to the read request transaction to Outbound controller portion 162. Outbound controller portion 162 sends the received read data to Bus signal controlling portion 161. Bus signals controlling portion 161 converts the received read data into a PCI transaction, sends it out to PCI bus 200, and delivers the PCI device requesting the read. As the retry and communication of read data over PCI bus 200 is in a typical PCI cycle and is generally known, the description of them will be omitted.

If a PCI bus error (an address parity error, a data parity error, SERR# detection) occurs when an inbound read transaction is performed on PCI bus 200, Bus signal controlling portion 161 in PCI bus controlling portion 16 detects the error and lights up Bus fault indicator 164a. At the same time, Bus signal controlling portion 161 discards the inbound read transaction received from PCI bus 200. After Bus fault indicator 164a lights up, PCI bus 200 is treated as in a degradation state.

Next, (4) a memory write by a PCI device (inbound write) will be described. A PCI device subordinate to PCI bus 200 performing a memory write drives request signal line REQ# and requests a right of using PCI bus 200 from Arbitration portion 165. In response, Arbitration portion 165 arbitrates for PCI bus 200 and gives permission of using PCI bus 200 to the requesting PCI device.

The PCI device acquired the right of using PCI bus 200 sends an inbound write request transaction to PCI bus controller 1 in I/O controller 5. Bus signal controlling portion 161 received the write request transaction converts the received PCI transaction into a transaction to be used in the platform and sends the transaction to Inbound controller portion 163.

Inbound controller portion 163 sends the received write request transaction to Inbound buffer controlling portion 14. Inbound buffer controlling portion 14 stores the received write request transaction in Buffer 14a.

After received all the write request transactions from the PCI device, Inbound buffer controlling portion 14 sends the transactions stored in Buffer 14a to Output I/F controlling portion 12. Output I/F controlling portion 12 sends the received write request transactions out to memory controller 3. Memory controller 3 writes on main memory 4 according to the transactions received from I/O controller 5. As this transmission of write data over PCI bus 200 is in a common PCI cycle and is generally known, the description of it will be omitted.

If a PCI bus error (an address parity error, a data parity error, SERR# detection) occurs when an inbound write transaction is performed on PCI bus 200, Bus signal controlling portion 161 in PCI bus controlling portion 16 detects the error and lights up Bus fault indicator 164a. Bus signal controlling portion 161 lighted Bus fault indicator 164a discards an inbound write transaction received from PCI bus 200. After Bus fault indicator 164a lights up, PCI bus is treated as in a degradation state.

Next, (5) processing of a transaction in a degradation state will be described. As described in the above processes (1) to (4), after Bus fault indicator 164a lights up, PCI bus controller 1 treats its subordinate PCI bus 200 as in a degradation state and processes following transactions as below.

An outbound read transaction to a PCI device is sent to PCI bus controller 1 in the same operations as the above-described one. The sent transaction arrives at Outbound controller portion 162 through Input I/F controlling portion 11 to Outbound buffer controlling portion 13.

Outbound controller portion 162 does not output the received transaction out to PCI bus 200 via Bus signal controlling portion 161. Instead, Outbound controller portion 162 converts the transaction into a read reply transaction with read data of ALL "1" and stores the read reply transaction in Buffer 14a in Inbound buffer controlling portion 14 via Inbound controller portion 163.

Inbound buffer controlling portion 14 sends the read reply transaction stored in Buffer 14a out to Output I/F controlling portion 12. Output I/F controlling portion 12 sends the received read reply transaction out to memory controller 3. The read reply transaction returns in the opposite direction to the above route; through memory controller 3 and processor bus 100 to processor 2, which sent the transaction, and to the bridge driver, which issued the read transaction.

An outbound write transaction to a PCI device is sent to PCI bus controller 1 in the same operation as the above described one. The sent transaction arrives at Outbound controller portion 162 through Input I/F controlling portion 11 to Outbound buffer controlling portion 13.

When the received transaction is Posted write, Outbound controller portion 162 discards the received transaction instead of outputting it to PCI bus 200 via bus signal controlling portion 161.

When the received transaction is Deferred write, Outbound controller portion 162 does not output the received transaction to PCI bus 200 via Bus signal controlling portion 161. Instead, Outbound controller portion 162 discards the received transaction and stores a normal write reply transaction in Buffer 14a in Inbound buffer controlling portion 14 via Inbound controller portion 163.

Inbound buffer controlling portion 14 sends the write reply transaction stored in Buffer 14a out to Output I/F controlling portion 12. Output I/F controlling portion 12 sends the received write reply transaction out to memory controller 3. The write reply transaction returns in the opposite direction to the above route; through memory controller 3 and processor bus 100 to processor 2, which sent the transaction.

For an inbound transaction from a PCI device, Arbitration portion 165 masks request signal line REQ# from the PCI device connected to PCI bus 200 subordinate to Arbitration portion 165. As a result, an inbound transaction is not received and further errors caused by fault propagation through PCI bus 200 are prevented.

Next, (6) a fault detecting by Bridge driver 412 will be described. Fault detecting for an outbound read transaction is performed as below. Bridge driver 412 checks the returned read data. When the received read data is ALL "1", Bridge driver 412 senses that an error may have occurred in PCI bus 200.

Bridge driver 412 sensed that an error may have occurred in PCI bus 200 sends a configuration read transaction to PCI bus controller 1 and checks the state of lights on Bus fault indicator 164a. When Bus fault indicator 164a lights up, Bridge driver 412 informs PCI device driver 411 of the occurrence of the fault. In response to receiving the information on the occurrence of the fault, PCI device driver 411 activates its own fault recovery program. Operations of the fault recovery program will be described later.

Fault detecting for an outbound write transaction will be performed as below. As PCI device driver 411 does not know whether the transaction completed normally or not, it timely calls degradation check function [pci_bus_check ( )] provided by Bridge driver 412 and checks the state of PCI bus 200.

Accordingly, Bridge driver 412 sends a configuration read transaction to PCI bus controller 1 and checks the state of lights on Bus fault indicator 164a. When Bus fault indicator 164a lights up, Bridge driver 412 informs PCI device driver 411 of the occurrence of the fault. In response to receiving the information on the occurrence of the fault, PCI device driver 411 activates its own fault recovery program.

Fault detecting for an inbound write transaction will be performed as below. As inbound transaction is not sent from PCI device during degradation of a PCI bus, PCI device driver 411 has no time to detect a fault.

In order to detect a fault, Bridge driver 412 periodically sends a configuration read transaction to PCI bus controller 1 and checks Bus fault indicator 164a. When Bus fault indicator 164a lights up, Bridge driver 412 informs PCI device driver 411 of the occurrence of the fault. In response to receiving the information on the occurrence of the fault, PCI device driver 411 activates its own fault recovery program.

Last, (7) recovery from a degradation state will be described. Recovery from a bus degradation state is performed as below. PCI device driver is informed of the occurrence of the fault and calls PCI bus degradation state recovery request function [pci_bus_recovery ( )] in its own fault recovery program.

Bridge driver 412 received the recovery request sends a configuration write request transaction for requesting a recovery operation from PCI bus controller 1 to reset Bus fault indicator 164a, while informing PCI device driver 411 that the bus is under a recovery process.

When the corresponding PCI bus 200 is already under a recovery process, Bridge driver 412 only informs PCI device driver 411 that the bus is under a recovery process. The configuration write request transaction arrives at PCI bus controller 1 in the same operation as that of an outbound transaction.

The transaction arrived at PCI bus controller 1 is received at Input I/F controlling portion 11 in PCI bus controller 1. As the received transaction is the configuration write request transaction, Input I/F controlling portion 11 routes the transaction to Outbound buffer controlling portion 13 and stores the transaction in Buffer 13a.

Outbound buffer controlling portion 13 storing the transaction requests a right of using PCI bus 200 from Arbitration portion 165. In response to receiving the request, Arbitration portion 165 arbitrates for PCI bus 200 and informs Outbound buffer controlling portion 13 of a permission to use PCI bus 200.

Outbound buffer controlling portion 13 received the information sends the transaction stored in Buffer 13a to Outbound controller portion 162. As Outbound controller portion 162 received a configuration write request transaction to its own PCI bus controller 1, it sends the transaction out to Configuration portion 164.

Configuration portion 164 resets Bus fault indicator 164a according to the received transaction and drives a PCI bus 200 reset signal to initialize a portion associated with a PCI bus and to recover from the degradation state. After recovered from the degradation state, Configuration portion 164 sends a configuration write reply transaction to Inbound controller portion 163.

Inbound controller portion 163 stores the received configuration write reply transaction in Buffer 14a in Inbound buffer controlling portion 14. Inbound buffer controlling portion 14 sends the configuration write reply transaction stored in Buffer 14a out to Output I/F controlling portion 12.

Output I/F controlling portion 12 sends the received configuration write reply transaction out to memory controller 3. The configuration write reply transaction returns in the opposite direction to the above route; through memory controller 3 and processor bus 100 to processor 2, which sent the transaction.

When Bridge driver 412 confirms the completion of the configuration write, it informs PCI device driver 411 that made a recovery request of the completion of the recovery. PCI device driver 411 informed of the completion of the recovery performs a process to reinstall its own PCI device into the system.

As mentioned above, in this embodiment, Bridge driver 412 and PCI bus controller 1 can cooperate so as to treat faulty PCI bus 200 as in a degradation state and handle a transaction performed when or after the fault occurs without propagating the fault. Thus, an occurrence of PCI bus fault can be detected without informing Processor 2 of the occurrence of the fault by means of an NMI signal line or an error reply, and system down as a result of executing an exception handler with insufficient function can be prevented and the computer system can operate continuously.

In this embodiment, when a fault (any type) occurs on a PCI bus, PCI bus controller 1 can treat PCI bus 200 as in a degradation state and Bridge driver 412 can inform PCI device driver 411 of the faulty PCI bus 200 of the occurrence of the fault. Thus, fault recovery can be performed by PCI device driver 411 irrespective of the type of fault on PCI bus 200.

The PCI device driver 411 can recover PCI bus 200 from a degradation state by initializing the PCI bus 200 with functions of Bridge driver 412 and PCI bus controller 1 and recover the bus from the fault by reinstalling its own PCI device.

Figure 9:
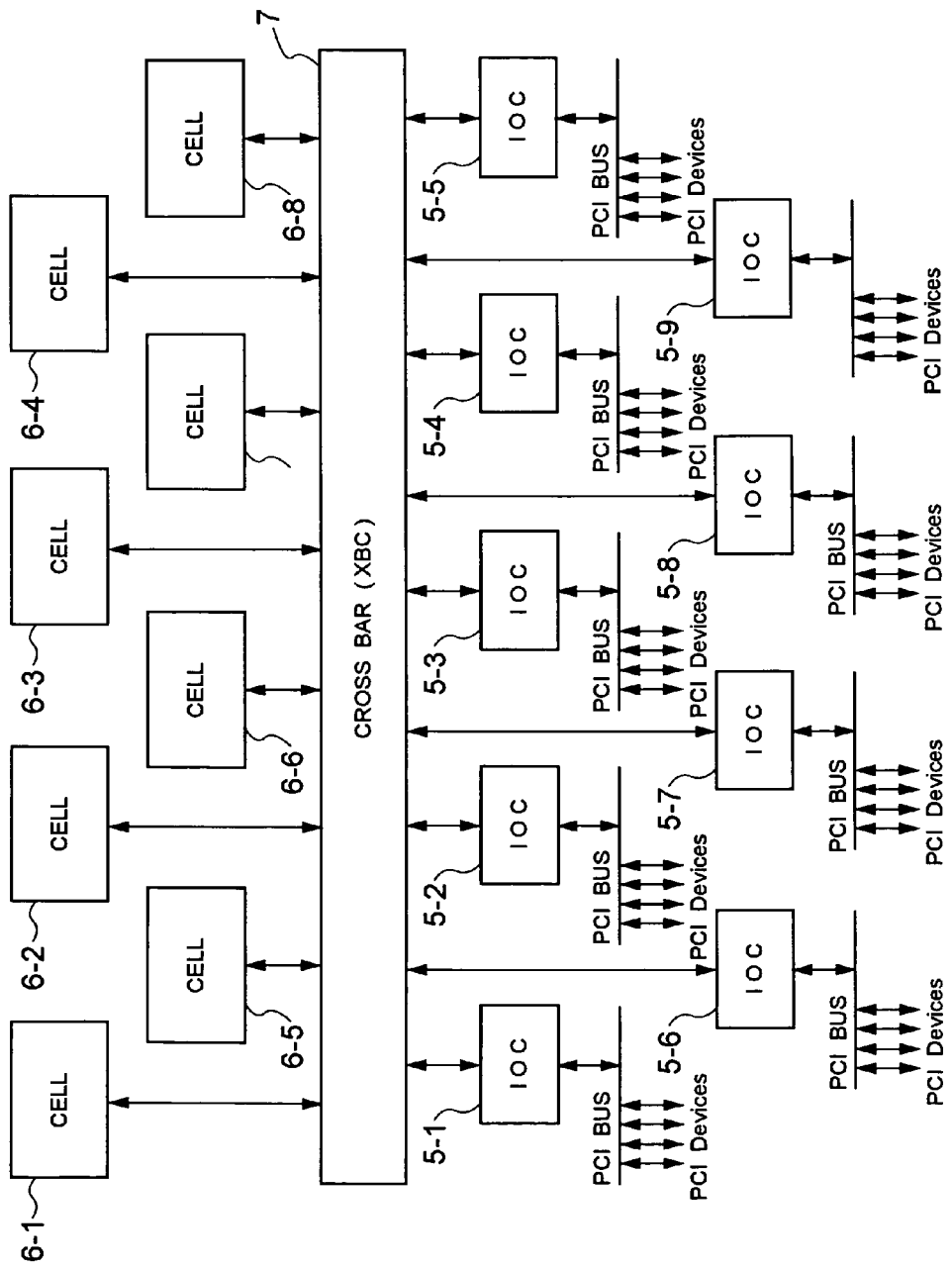
FIG. 9 is a block diagram illustrating a configuration of a computer system according to another embodiment of the present invention.
Figure 10:
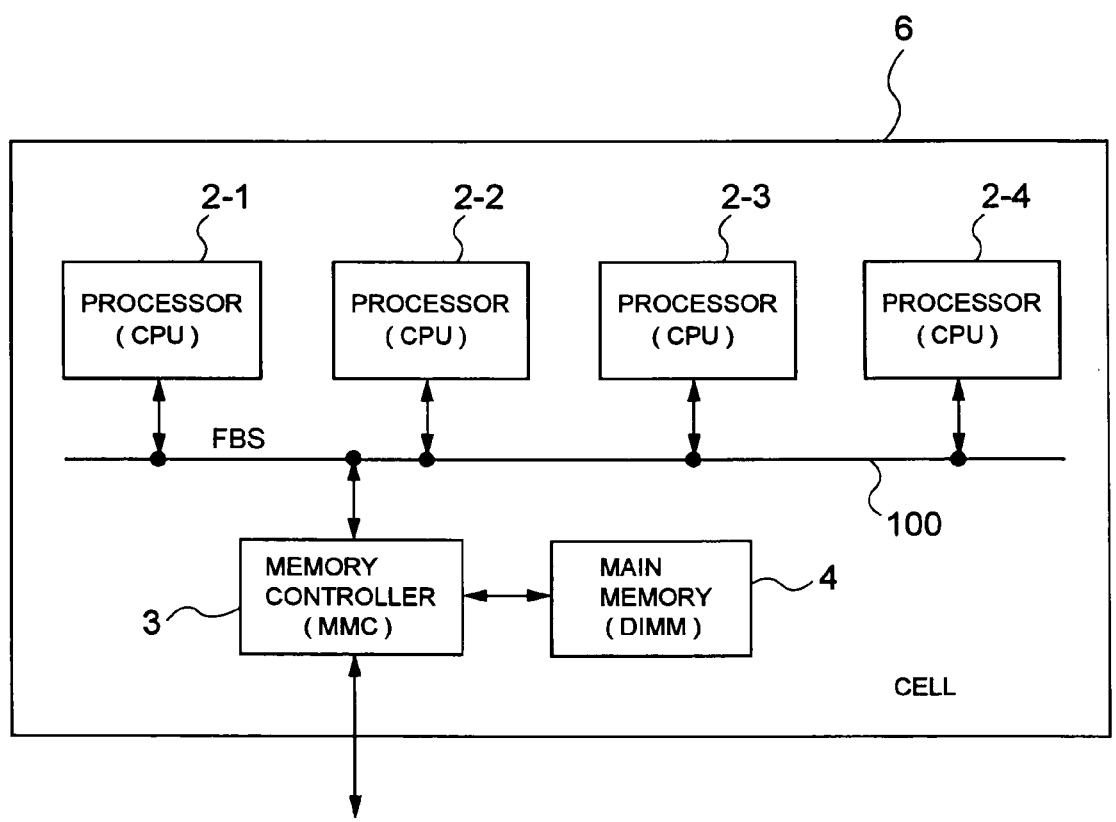
FIG. 10 is a block diagram illustrating a configuration of a cell shown in FIG. 9.
Figure 11:
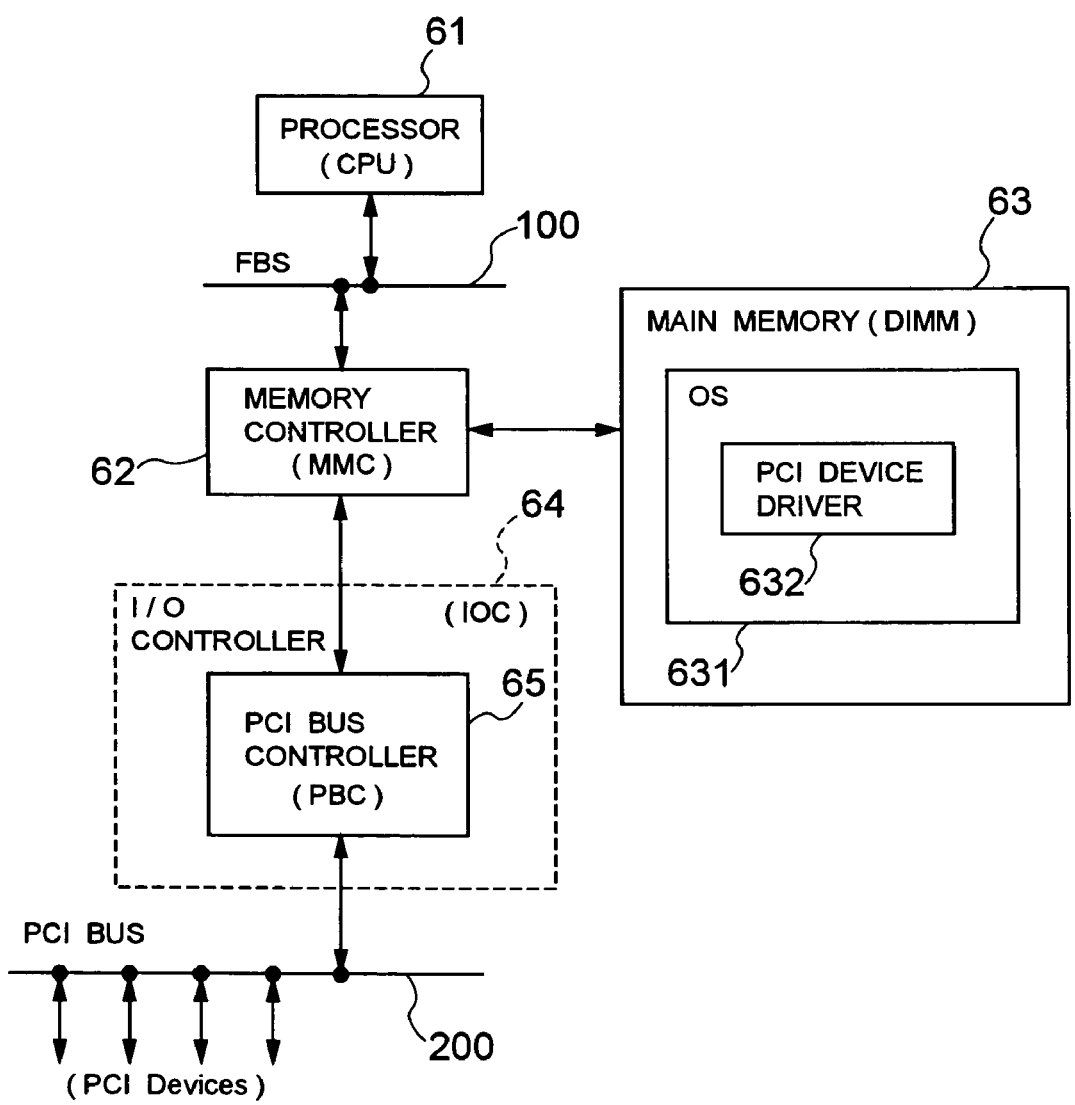
FIG. 11 is a block diagram illustrating a configuration of a computer system according to a conventional example.
Figure 12:
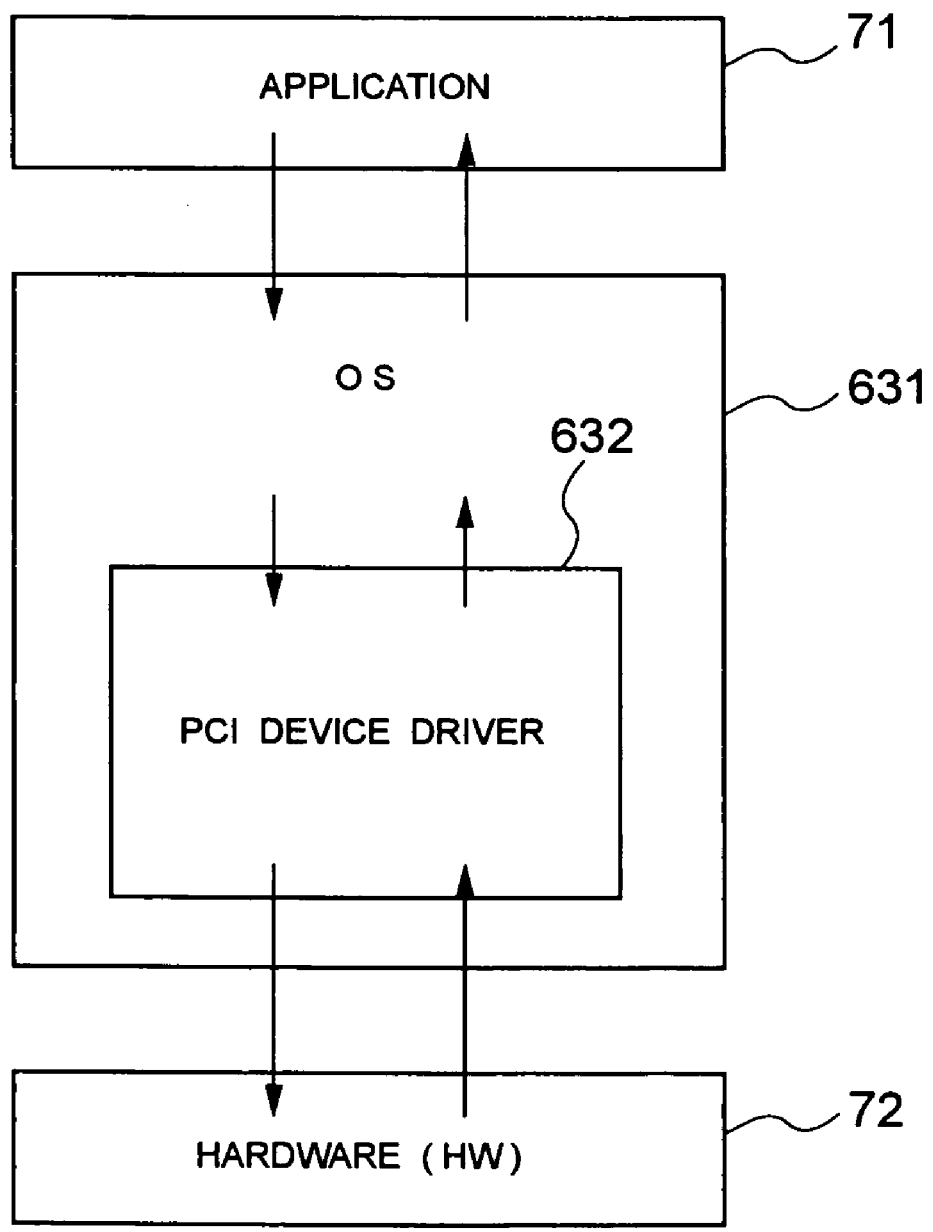
FIG. 12 is a conceptual diagram illustrating an input/output of signals to/from an OS shown in FIG. 11.

FIG. 9 is a block diagram illustrating a configuration of a computer system according to another embodiment of the present invention. FIG. 10 is a block diagram illustrating a configuration of Cell shown in FIG. 9. In FIG. 10, a computer system according to another embodiment of the present invention is what the present invention is applied to a system bigger than the embodiment of the present invention.

FIG. 1 shows an example of minimum configuration of a computer system. In FIG. 9, a bigger computer system (a multiprocessor system) is built by incorporating processor 2/processor bus 100/memory controller 3/main memory 4 in the minimum configuration shown in FIG. 1 in a single component of cell 6, increasing the number of CPUs in cell 6 (in FIG. 9, four processors 2-1-2-4), integrating I/F of memory controller 3 and of I/O controller 5 into cross bar (XBC) 7, and increasing the number of I/O controller 5 and PCI bus 200 (in FIG. 9, nine I/O controllers 5-1-5-9).

In this case, cross bar 7 is connected with eight cells 6-1-6-8. As a system with such cross bar 7 is generally known, the description of it will be omitted.

A system shown in FIG. 9 is a large-scale multiprocessor system with cross bar 7 that is 32 way processing machine including eight cells 6-1-6-8 with four processors 2-1-2-4 incorporated in a single cell 6.

Even in such a large-scale multiprocessor system, operations such as an I/O read from processor 2, an I/O write from processor 2, a memory read from a PCI device, and a memory write from a PCI device are performed by sending and receiving a transaction as the abovementioned outbound read/outbound write/inbound read/inbound write. For this large-scale multiprocessor system, crossbar 7 is added as a component. Crossbar 7 does not affect any operation of PCI bus fault processing method according to the present invention, as it just passes each transaction.

Therefore, a PCI bus fault processing method according to the present invention is independent of the configuration scale of a large-scale multiprocessor system shown in FIG. 9 and is as effective as an embodiment of the present invention.

What is claimed is:

1. A computer system comprising a bus controller for controlling an input/output bus, wherein said input/output bus connects a processor, main memory, and a plurality of input/output devices, comprising:
 a bridge driver, stored in the main memory, for monitoring a degradation state of said input/output bus and instructing to recover said input/output bus from the degradation state;
 wherein said bridge driver comprises means for informing a device driver of the fault and means for accessing said input/output bus;
 wherein said bus controller comprises means for treating a faulty input/output bus as in a degradation state and means for preventing propagation of said fault and handling a transaction performed when or after the fault occurs; and
 wherein said computer system causes said bridge driver and said bus controller cooperated in causing said input/output device to perform processes from detecting of the fault on said input/output bus to recovery.

2. The computer system according to claim 1, wherein said bus controller comprises a bus fault indicator that lights up when an error on said input/output bus is detected; and
 wherein said bus controller treats said input/output bus as in a degradation state when said bus fault indicator lights up.

3. The computer system according to claim 1, wherein said bus controller comprises input/output bus controlling means for always returning a normal reply for an error in a write process to said input/output device, and always returning a normal reply for an error in a read process from said input/output device, while reading out data with all predetermined values to cause the read from said input/output device to be retried, for a transaction with said input/output bus fault detected.

4. The computer system according to claim 3, wherein said input/output bus controlling means enables a transaction to said input/output device and prevents a transaction from being received from said input/output device for a following transaction sent after said input/output bus comes into degradation.

5. The computer system according to claim 1, wherein said bridge driver further comprises a function of detecting said fault by monitoring a degradation state of said bus controller and informing said corresponding input/output devices of the occurrence of a fault, and a function of issuing an instruction to recover said input/output bus from the degradation state to said bus controller in response to a request from said input/output device and informing said requesting input/output device of the result.

6. The computer system according to claim 5, wherein, in response to receiving said recovery information, said input/output device initializes its own device and reinstalls the device on the system.

7. A bus controller for controlling an input/output bus in a computer system controlled by an OS (Operating System), wherein said input/output bus connects a processor, main memory, and a plurality of input/output devices; comprising means for preventing a fault occurred at said input/output bus from being propagated to said OS, wherein said bus controller causes an instruction to recover from the fault to be issued when said means prevents propagation of said fault to said OS, said bus controller having a bridge driver section, stored in the main memory, comprising means for informing a device driver of the fault, and means for accessing said input/output bus.

8. The bus controller according to claim 7, wherein said input/output bus is a PCI (Peripheral Component Interconnect) bus.

9. A bus controller for controlling an input/output bus in a system, wherein said input/output bus connects a processor, main memory, and a plurality of input/output devices in said system, comprising:
means for treating a faulty input/output bus as in a degradation state; and
means for preventing propagation of said fault and handling a transaction performed when or after said fault occurs;
wherein said bus controller causes said input/output device to perform processes from detecting of a fault on said input/output bus to recovery in cooperation with a bridge driver, stored in the main memory; wherein said bridge driver monitors said degradation state and instructs to recover said input/output bus from the degradation state, and wherein said bridge driver comprises means for informing a device driver of the fault, and means for accessing said input/output bus.

10. The bus controller according to claim 9, comprising a bus fault indicator that lights up when an error on said input/output bus is detected, wherein said bus controller treats said input/output bus as in a degradation state when said bus fault indicator lights up.

11. The bus controller according to claim 9, comprising input/output bus controlling means for always returning a normal reply for an error in a write process to said input/output device, and always returning a normal reply for an error in a read process from said input/output device, while reading data with all predetermined values out to cause the read from said input/output device to be retried, in response to a transaction with said input/output bus fault detected.

12. The bus controller according to claim 11, wherein said input/output bus controlling means enables a transaction to said input/output device and prevents a transaction from being received from said input/output device for a following transaction sent after said input/output bus comes into degradation.

13. A bus fault handling method in a computer system comprising a bus controller for controlling an input/output bus that connects a processor, main memory, and a plurality of input/output devices in said computer system; wherein a bridge driver, stored in the main memory, and said bus controller cooperate in causing said input/output device to perform processes from detecting of a fault on said input/output bus to recovery; wherein a faulty input/output bus is treated as in a degradation state, propagation of said fault is prevented, and a transaction performed when or after said fault occurs is handled at said bus controller; and wherein said bridge driver monitors a degradation state of said input/output bus, instructs to recover said input/output bus from the degradation state, informs a device driver of the fault through said bridge device, and accesses said input/output bus through said bridge device.

14. The bus fault handling method according to claim 13, wherein said bus controller comprises a bus fault indicator that lights up when an error on said input/output bus is detected, and wherein said bus controller treats said input/output bus as in a degradation state when said bus fault indicator lights up.

15. The bus fault handling method according to claim 13, wherein said method causes input/output bus controlling means in said bus controller to always return a normal reply for an error in a write process to said input/output device, always return a normal reply for an error in a read process from said input/output device, and read data with all predetermined values out to cause the read process from said input/output device to be retried for a transaction with said input/output bus fault detected.

16. The bus fault handling method according to claim 15, wherein said input/output bus controlling means enables a transaction to said input/output device and prevents a transaction from being received from said input/output device for a following transaction sent after said input/output bus comes into degradation.

17. The bus fault handling method according to claim 13, wherein said bridge driver detects said fault by monitoring a degradation state of said bus controller, informs said corresponding input/output device of the occurrence of a fault, and issues an instruction to recover said input/output bus from the degradation state to said bus controller in response to a request from said input/output device and informs said requesting device of the result.

18. The bus fault handling method according to claim 17, wherein, in response to receiving the recovery information, said input/output device initializes its own device and reinstalls the device on the system.

* * * * *